United States Patent [19]

Bradshaw

[11] 3,723,563
[45] Mar. 27, 1973

[54] DISPROPORTIONATION OF OLEFINS

[75] Inventor: Christopher Patrick Cadman Bradshaw, Sunbury-on-Thames, England

[73] Assignee: The British Petroleum Company, Limited, London, England

[22] Filed: July 12, 1971

[21] Appl. No.: 162,021

Related U.S. Application Data

[63] Continuation of Ser. No. 799,497, Feb. 14, 1969, abandoned.

[30] Foreign Application Priority Data

Mar. 5, 1968 Great Britain......................10,629/68

[52] U.S. Cl. ..............................................260/683 D
[51] Int. Cl. ................................................C07c 3/62
[58] Field of Search....................................260/683 D

[56] References Cited

UNITED STATES PATENTS

| | | | |
|---|---|---|---|
| 3,026,269 | 3/1962 | Gresham et al. | 252/429 |
| 3,166,547 | 1/1965 | Loeb | 252/429 |
| 3,232,920 | 2/1966 | Naylor | 252/429 |

Primary Examiner—Delbert E. Gantz
Assistant Examiner—C. E. Spresser
Attorney—Morgan, Finnegan, Durham & Pine

[57] ABSTRACT

A catalyst for olefin disproportionation comprises a molybdenum or tungsten salt and a Group IVb organometallic compound. A preferred system is tungsten hexachloride and tetra-n-butyl tin.

6 Claims, No Drawings

DISPROPORTIONATION OF OLEFINS

This application is a continuation of Ser. No. 799,497 filed Feb. 14, 1969, now abandoned.

This invention relates to a novel catalyst system for the disproportionation of olefins and to a disproportionation process and coreaction process using the new catalyst system.

A disproportionation reaction is one in which an olefin is converted to products having higher and lower carbon numbers than the olefin starting material; and a disproportionation catalyst is a catalyst which is capable of effecting such a reaction. Heterogeneous disproportionation catalysts are known, for example, a mixture of molybdenum oxide and alumina, preferably containing cobalt oxides, and optionally containing minor amounts of alkali metal or alkaline earth metals; molybdenum, tungsten or rhenium carbonyls supported on alumina, silica or silica-alumina; tungsten oxide supported on alumina and rhenium heptoxide on alumina.

In South African Pat. No. 67/1913 a homogeneous catalyst system is described comprising three components: (A) an organometallic compound of Groups Ia, IIa, IIb, or IIIa of the Periodic Table (B) a salt of molybdenum or tungsten and (C) a defined organic compound containing oxygen or sulphur e.g., ethyl alcohol.

It is an object of the present invention to provide new and useful homogeneous disproportionation catalysts.

It has now been discovered that homogeneous disproportionation catalyst systems can be prepared containing an organometallic compound of Group IVb of the Periodic Table.

Thus according to the present invention there is provided a homogeneous disproportionation catalyst system comprising (i) a salt of molybdenum or tungsten and (ii) an organometallic compound of a metal of Group IVb of the Periodic Table according to Mendeleef.

The preferred salts of tungsten and molybdenum are tungsten hexachloride and molybdenum pentachloride. Tungsten hexachloride is the more preferred.

The organometallic compound of the Group IVb metal (e.g., Ge, Sn or Pb) should have at least one metal to carbon bond. The preferred compounds are those of tin, more preferably: tetra n butyltin.

The invention also comprises a disproportionation process which process comprises contacting an acyclic olefin of formula $RR_1C = CR_2R_3$ wherein the R substituents represent hydrogen atoms or alkyl or aryl groups with the above defined homogeneous disproportionation catalyst system under conditions of temperature and pressure which effect disproportionation of the feed.

The invention further comprises a process for the coreaction of acyclic olefins which process comprises contacting two dissimilar acyclic olefins of the formula $RR_1C = CR_2R_3$ and $R_4R_5C = CR_6R_7$ with the defined disproportionation catalyst system under conditions of temperature and pressure which effect coreaction of the feed, the R substituents representing hydrogen atoms, alkyl or aryl groups, with the proviso that not more than two of the groupings $RR_1C =$, $R_3R_2C =$, $R_4R_5C =$ or $R_6R_7C =$ are the same.

Acyclic olefins suitable as feeds include $C_{3-30}$ alkenes, preferably $C_{3-8}$ straight chain alkenes. The alkenes may be alpha, beta or gamma etc., alkenes. Suitable alkenes include propylene, butene-1, butene-2, pentene-1, pentane-2, hexene-1, hexene-2, hexene-3, heptene-1, heptene-2, heptene-3, octene-1, octene-2, etc. Branched chain $C_{4-30}$ alkenes are also suitable feeds.

It is preferred to remove all traces of noxious impurities from the feed, e.g., by treating the pentene-2 feed with tungsten hexachloride which is subsequently removed by percolation through a silica column.

The reaction temperature may be from $-100°C$ to $+300°C$, preferably from $-20°C$ to $+50°C$.

The reaction pressure may be from 10 mm of mercury to 2,000 psig, preferably that pressure which will maintain the reaction in the liquid phase e.g. 0 – 200 psig.

The reaction may be performed in the gaseous or liquid phases preferably in the liquid phase, and may be operated continuously or batch-wise.

Suitable weight ratios of olefin to tungsten or molybdenum salt are from $10^6:1$ to 2:1 preferably $10^4:1$ to $10^2:1$.

Suitable weight ratios of tungsten or molybdenum salt to Group IVb metal compound are from 5:1 to 0.01:1 preferably from 1:1 to 0.1:1.

The catalyst system may be prepared by mixing the components (i) and (ii) referred to above in the inert solvent e.g. benzene, cyclohexane or n-heptene. The dilution is not critical.

The invention is illustrated but not limited by the following Examples.

EXAMPLE 1

Solutions of 0.025 M of $WCl_6$ and 0.2 M of $Sn(n-C_4H_9)_4$ were made up in benzene which had been freshly distilled over potassium metal. Aliquots of these solutions were added to 0.1 mole of dry pentene-2 diluted with 15 ml of dry benzene. The solutions were thoroughly mixed and allowed to stand for 24 h at ambient temperature. To each was then added 1 ml of methanol to terminate the reaction. The reaction products were then analyzed. All operations were carried out in a dry $N_2$ atmosphere. The results of a series of experiments, in which the proportion of $Sn(nC_4H_9)_4$ was varied, are tabulated below:

| ml of 0.025M $WCl_6$ added | ml of 0.2 0.2M $SN(nC_4H_9)_4$ added | Molar ratio of Pentene-2/ W/Sn | Conversion percent wt | *Products percent wt | | |
|---|---|---|---|---|---|---|
| | | | | Butene-2 | Pentene-2 | Hexene-3 |
| 4.0 | 0.5 | 1000/1/1 | 26.5 | 11.2 | 73.5 | 15.3 |
| 4.0 | 1.0 | 1000/1/2 | 28.8 | 11.6 | 71.2 | 17.2 |
| 4.0 | 2.0 | 1000/1/4 | 36.0 | 14.4 | 64.0 | 21.6 |
| 4.0 | 4.0 | 1000/1/8 | 37.8 | 15.1 | 62.2 | 22.7 |
| 4.0 | 6.0 | 1000/1/12 | 37.8 | 16.3 | 62.2 | 21.5 |
| 4.0 | 8.0 | 1000/1/16 | 26.0 | 10.9 | 74.0 | 15.1 |

*Excluding benzene

EXAMPLE 2

In this example the benzene was distilled over potassium metal and percolated through a silica column which had been activated at 580°C. The pentene-2 feed was purified by treating with silica in the same manner.

0.01 Millimole of WCl. (1.0 ml 0.01 M $WCl_6$ in benzene) followed by 0.1 millimole of $Sn(n-Bu)_4$ [1.0 ml 0.1 M $Sn(n-Bu)_4$ in benzene] were added to 5.5 ml of pentened2 in 6.0 ml of benzene in an atmosphere of dry nitrogen such that the molar ratios of $C_5^{-2}$:W:Sn were 5,000:1:10. The mixture was agitated occasionally and the reaction terminated by addition of isopropanol after 30 minutes when analysis showed a conversion to $C_4^{-2}$ and $C_6^{-3}$ of 50 per cent. Using an identical catalyst and a feed to tungsten ratio of 10,000:1 the conversion was only a trace (1 per cent) after 30 minutes.

EXAMPLE 3

Benzene and pentene-2 were purified as in Example 1 except that pentene-2 was further purified by adding $WCl_6$ (1 mole/15,000 mole of $C_5^{-2}$) which was subsequently removed by percolation through a silica column.

0.005 Millimole of $WCl_6$ (0.5 ml of 0.01 M $WCl_6$ in benzene) followed by 0.05 millimole of $Sn(n-Bu)_4$[0.5 ml of 0.1 M $Sn(n-Bu)_4$ in benzene] were added to 5.5 ml of pentene-2 and 6.0 ml of benzene in an atmosphere of dry nitrogen such that molar ratios of $C_5^{-2}$:W:Sn were 10,000:1:10. The mixture was agitated occasionally and the reaction terminated with isopropanol after 30 minutes when analysis showed a conversion to $C_4^{-2}$ and $C_6^{-3}$ of 45 per cent. Using an identical catalyst at a feed to tungsten ratio of 15,000:1 a conversion of 18.9 per cent was observed after 30 minutes.

EXAMPLE 4

Benzene and pentene-2 were purified as in Example 2. A catalyst identical to that in Example 1 —except that $Sn(n-Bu)_4$ was replaced by $SnMe_4$ — was used.

0.05 millimole (5.0 ml of 0.01 M $WCl_6$ in benzene) followed by 0.5 millimole $SnMe_4$[5.0 ml of 0.1 M $SnMe_4$ in benzene] were added to 5.5 ml of pentene-2 in an atmosphere of dry nitrogen such that the molar ratios of $C_5^{-2}$:W:Sn were 1,000:1:10. The mixture was agitated occasionally and the reaction terminated by the addition of isopropanol after 30 minutes when analysis showed conversion to $C_4^{-2}$ and $C_6^{-3}$ of 47.7 per cent.

EXAMPLE 5

In this example a catalyst was prepared from $PbMe_4$ and $WCl_6$. Benzene and pentene-2 were purified as in Example 1.

0.0125 millimole $WCl_6$ (0.125 ml 0.01 M $WCl_6$ in benzene) followed by 0.125 millimole $PbMe_4$[1.25 ml 0.1 M $PbMe_4$ in benzene] were added to 5.5 ml of pentene-2 in an atmosphere of dry nitrogen such that the molar ratios $C_5^{-2}$:W:Pb were 4,000:1:10. The mixture was agitated occasionally; after 30 minutes the conversion to $C_4^{-2}$ and $C_6^{-3}$ was 8.0 percent; after a 64 hour contact time the conversion to $C_4^{-2}$ and $C_6^{-3}$ had increased to 20.0 per cent.

EXAMPLE 6

Benzene and a mixture of pentene-2 and pentene-1 were purified as in Example 2.

0.02 millimoles of $WCl_6$ (2.0 ml of 0.01 M $WCl_6$) followed by 0.2 millimole $Sn(n-Bu)_4$[2.0 ml $Sn(n-Bu)_4$ 0.1 M] were added to 1.1 ml of a mixture of pentene-1 13.7 per cent, pentene-2 86.3 per cent, in an atmosphere of dry nitrogen such that the molar ratios of $C_5^{-2}$:W:Sn were 500:1:10. The mixture was agitated occasionally and the reaction terminated by addition of isopropanol after 30 minutes when analysis showed a conversion to $C_3^-$, $C_4^-$, $C_6^-$, $C_7^-$ of 25 per cent. Using an identical catalyst and a feed to tungsten ratio of 1,000:1 the conversion to $C_3^-$, $C_4^{-1}$, $C_4^{-2}$, $C_6^{-2}$, $C_6^{-3}$ and $C_7^{-3}$ is 14.5 per cent.

The following reactions took place:

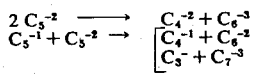

The detailed results for these two experiments were as given below:

| $C_5^-$:W:Sn molar ratio | Products % wt | | | | |
|---|---|---|---|---|---|
| | $C_3^-$ | $C_4^-$ | $C_5^-$ | $C_6^-$ | $C_7^-$ |
| 500:1:10 | 1.3 | 7.9 | 75.0 | 12.5 | 3.3 |
| 1000:1:10 | 0.5 | 5.5 | 85.5 | 6.8 | 1.8 |

Examples 2 and 3 illustrate that improved feed purification increases the activity of the catalyst. Example 4 shows that alternative Sn alkyls may be used. Example 5 shows that Pb alkyls are active. Example 6 demonstrates that the coreaction of mixed olefins (including α-olefins) is effected by these catalysts.

What is claimed is:

1. A process for the coreaction of acyclic olefins which process comprises contacting two dissimilar acyclic olefins comprising $C_3$ to $C_{30}$ alkenes of formula $RR_1C=CR_2R_3$ and $R_4R_5C=CR_6R_7$ with a disproportionation catalyst system comprising (1) salt of molybdenum or tungsten and (2) an organometallic compound of a metal of Group IVb of the Periodic Table according to Mendeleef in an inert solvent selected from benzene, cyclohexane, or n-heptane under conditions of temperature in the range of −100°C to +300°C and pressure which affect coreaction of the feed, and R substituents representing hydrogen atoms or alkyl groups, with the proviso that not more than 2 of the groupings $RR_1C=$, $R_3R_2C=$, $R_4R_5C=$ or $R_6R_7C=$ are the same.

2. A process according to claim 1 wherein the feedstock comprises $C_{3-8}$ straight chain alkenes.

3. A process according to claim 1 wherein the salt of molybdenum or tungsten is tungsten hexachloride or molybdenum pentachloride.

4. A process according to claim 1 wherein the organometallic compound is tin.

5. A process according to claim 4 wherein the compound of tin is tetra-n-butyl tin.

6. A process according to claim 1 wherein the reaction is effected at a temperature in the range −20°C to +50°C.

* * * * *